United States Patent [19]

Grow

[11] Patent Number: 4,706,922

[45] Date of Patent: Nov. 17, 1987

[54] HANGAR FOR FIBERGLASS DUCTS

[76] Inventor: Terry K. Grow, 1258 N. 700 East, Bountiful, Utah 84010

[21] Appl. No.: 854,007

[22] Filed: Apr. 21, 1986

[51] Int. Cl.⁴ ............................................. F16M 13/00
[52] U.S. Cl. .................................... 248/546; 52/713; 248/58; 248/317
[58] Field of Search ................... 248/58, 65, 339, 317, 248/DIG. 6, 546; 52/712, 715, 713; 24/350, 354, 355; 411/457, 458

[56] References Cited

U.S. PATENT DOCUMENTS

| 249,850 | 11/1881 | McGill | 411/457 X |
| 344,691 | 6/1886 | Thomas | 411/458 X |
| 1,736,807 | 11/1929 | Thomas | 411/457 X |
| 2,291,148 | 7/1942 | Carson | 248/58 |
| 2,328,867 | 9/1943 | Veteran | 411/458 |
| 3,279,300 | 10/1966 | Larson | 248/546 X |

Primary Examiner—Robert W. Gibson, Jr.
Assistant Examiner—David L. Talbott

[57] ABSTRACT

A hangar for fiberglass ducts comprising a vertical arm, horizontal arm, top hook and bottom, up-turned spike, all of a single piece of wire and a support plate located on the horizontal arm by a hole through the plate through which the spike is inserted and a slot through which the vertical arm passes.

2 Claims, 2 Drawing Figures ically adaptable for use with fiberglass duct work. While other hangers for pipes and ducts have been proposed, as for example in U.S. Pat. Nos. 2,286,118 (Sleeth) and 2,304,973 (Vecchiola), none are easily and quickly installed and will readily stabilize fiberglass ducts.

HANGAR FOR FIBERGLASS DUCTS

BACKGROUND OF THE INVENTION

1. Field of the Invention

The present invention pertains to the field of hangars for ventilation ducts and particularly for fiberglass ventilation ducts.

2. Prior Art

There are a number of hangars for pipes, ventilation ducts and other such structures that include means to connect a duct to walls, ceilings, joists or other part of the structural surrounding. Some of these devices employ pointed ends which can be driven into joists or other support members. For example, U.S. Pat. Nos. 2,291,148, which discloses a pipe hangar having a U-shape to straddle a pipe and a seat on which a pipe rests, and 2,641,428, which also discloses a pipe hangar having U-shape to straddle a pipe and rollers on which the pipe rests. In addition, the devices of the patents provide load bearing surfaces for the supported piping or ductwork. Ducts frequently are supported by straps attached to floor joists or other support means at opposite sides of the ducts and passed beneath the ducts.

Often many duct supporting hangars are used in even small ventilation or heating systems. Ease of installation and low cost are of paramount concern necessary to minimize installation costs of a duct system. For the same reason, the hangars must be of light weight and must be of low cost.

Fiberglass ventilation ducts have also been developed as a means of reducing the weight of ducts used. With the development of the fiberglass ducts a need for hangars suitable for use with such ducts has developed. None of the devices heretofore known are sufficiently low in weight and cost to be completely satisfactory for use in fiberglass duct support. Furthermore, the use of fiberglass ducts allow for ease and speed of installation if proper hangars are used. None of the devices known to the prior art are specifically adaptable for use with fiberglass duct work. While other hangers for pipes and ducts have been proposed, as for example in U.S. Pat. Nos. 2,286,118 (Sleeth) and 2,304,973 (Vecchiola), none are easily and quickly installed and will readily stabilize fiberglass ducts.

OBJECTS OF THE INVENTION

A principal object of the present invention is to provide a hangar for fiberglass ducts.

Another object of the present invention is to provide a hangar for fiberglass ducts that is light in weight.

Yet another object of the present invention is to provide a hangar for fiberglass ducts that is low in cost.

Still other objects of the present invention are to provide a hangar for fiberglass ducts that can be easily and quickly installed, that can be adjusted for use with different sizes of fiberglass ducts and that will securely stabilize the ducts.

FEATURES OF THE INVENTION

Principal features of the invention include an angled support bracket made of heavy galvanized wire with sharpened ends that act as spikes to be driven into joists and other supporting structures and also driven into a fiberglass ventilation duct. Additional support for the duct is provided by a support plate positioned between the support bracket and the bottom of the duct.

Other objects and features of the invention will become apparent from the following detailed description and drawing disclosing what are presently contemplated as being the best modes of the invention.

THE DRAWING

In the drawing:

FIG. 1 is a perspective drawing of the hanger invention; and

FIG. 2, a cross-section view of one embodiment of the invention as shown attached to a ventilation duct.

DETAILED DESCRIPTION OF THE INVENTION

Figure 1:
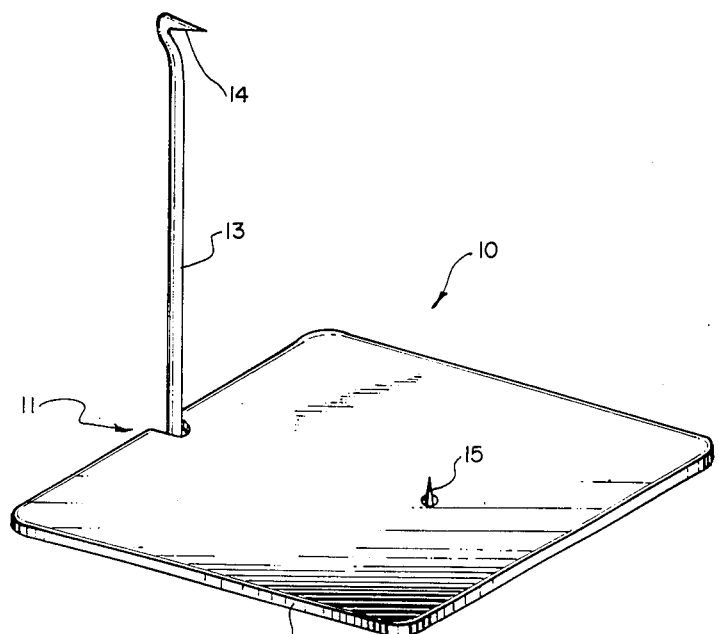
Figure 2:
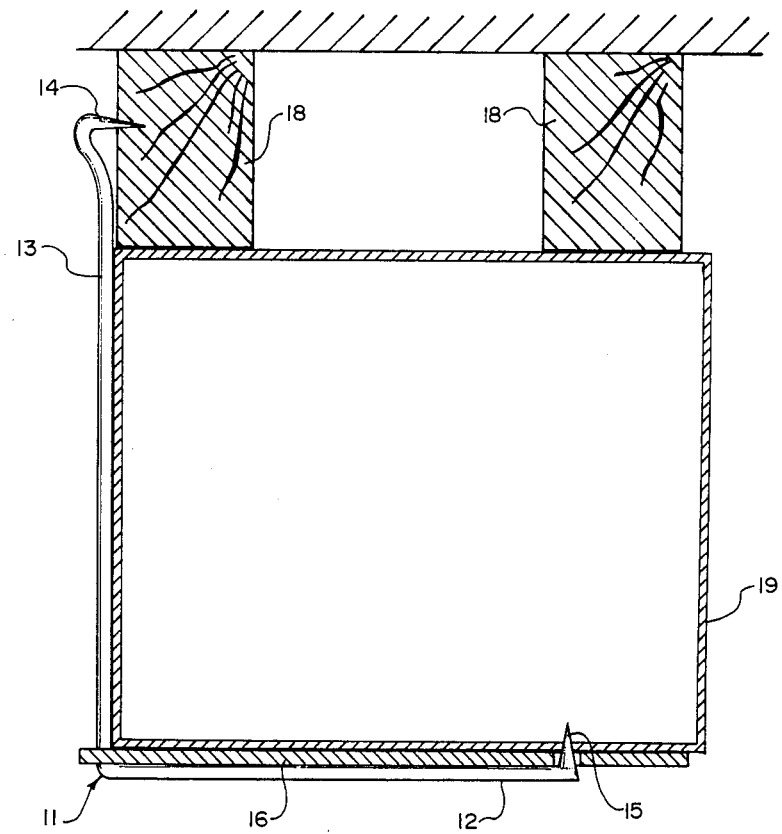

Referring now to the drawing:

In the illustrated preferred embodiment the hangar of the invention is shown generally at 10 in FIG. 1. The hanger 10 is comprised of length of a heavy gage corrosion-resistant wire 11 bent ninety degrees to form a horizontal support arm 12 and vertical support arm 13. At the upper and lower ends the wire hangar 11 is again bent ninety degrees to form sharpened ends or spikes 14 and 15, respectively, that are adapted to be hammered into a joist 18 or similar supporting structure and to extend into the wall of a duct 19. It will be apparent that the upper sharpened end 14 may also be rotated ninety degrees in the place normal to vertical support arm 13. This will permit the hangar to be suspended from a transverse joist.

A flat support plate 16 is adapted to be snapped into place on the horizontal support arm 12. The plate 16 is slotted at 17 to fit around the arm 13 and has a hole 17a therethrough through which a spike 15 is inserted.

Although a preferred form of my invention has been herein disclosed, it is to be understood that the present disclosure is by way of example and that variations are possible without departing from the subject matter coming within the scope of the following claims, which subject matter I regard as my invention.

I claim:

1. A fiberglass duct hangar comprising
   a vertical support arm;
   a horizontal support arm extending from a bottom end of the vertical support arm;
   a sharpened hook angled from the top end of the vertical support arm;
   a spike extending upwardly from the horizontal support arm at an end opposite the vertical support arm; and
   a flat support plate resting on the horizontal support arm, said flat support plate having a hole therethrough through which the spike extends and a slot extending inwardly from an edge thereof in which the vertical support arm is positioned.

2. A fiberglass hangar as in claim 1, wherein the vertical support arm, horizontal support arm, hook and spike are all formed from a single piece of wire.

* * * * *

UNITED STATES PATENT AND TRADEMARK OFFICE
CERTIFICATE OF CORRECTION

PATENT NO. : 4,706,922

DATED : November 17, 1987

INVENTOR(S) : Terry K. Crow

It is certified that error appears in the above-identified patent and that said Letters Patent is hereby corrected as shown below:

On the title page, Item [76], "Terry K. Grow" should read

-- Terry K. Crow --.

Signed and Sealed this

Tenth Day of May, 1988

Attest:

DONALD J. QUIGG

Attesting Officer

Commissioner of Patents and Trademarks